United States Patent [19]

Freeman

[11] 3,978,724

[45] Sept. 7, 1976

[54] FLUIDIC ANGLE-OF-ATTACK SENSOR

[75] Inventor: Peter A. Freeman, Baltimore, Md.

[73] Assignee: The United States of America as represented by the Secretary of the Navy, Washington, D.C.

[22] Filed: Dec. 4, 1975

[21] Appl. No.: 637,541

[52] U.S. Cl. .................................. 73/180
[51] Int. Cl.² ......................... G01C 21/00
[58] Field of Search .............. 73/180; 137/835, 805, 137/829, 839; 244/77 D

[56] References Cited
UNITED STATES PATENTS

| | | |
|---|---|---|
| 3,327,529 | 6/1967 | Bowles et al .......................... 73/180 |
| 3,434,487 | 3/1969 | Baur ................................. 137/835 |
| 3,452,707 | 7/1969 | Warren ............................... 73/180 |

Primary Examiner—Donald O. Woodiel
Attorney, Agent, or Firm—R. S. Sciascia; Paul S. Collignon

[57] ABSTRACT

A fluidic angle-of-attack sensor for providing a differential output proportional to the angle-of-attack of flow impinging on the sensor. An excitation flow nozzle discharges into a coanda-effect cavity which opens into a centrally oriented impingement cavity so that excitation flow penetrates and impinges on the ambient flow field. A pair of output ports alternately intercept part of the excitation stream to provide a differential output pressure. When the sensor is pointed across the flow field, the flow field augments the coanda effect in bending the stream one way while opposing it in bending it the other way to provide a differential output pressure proportional to angle-of-attack.

6 Claims, 10 Drawing Figures

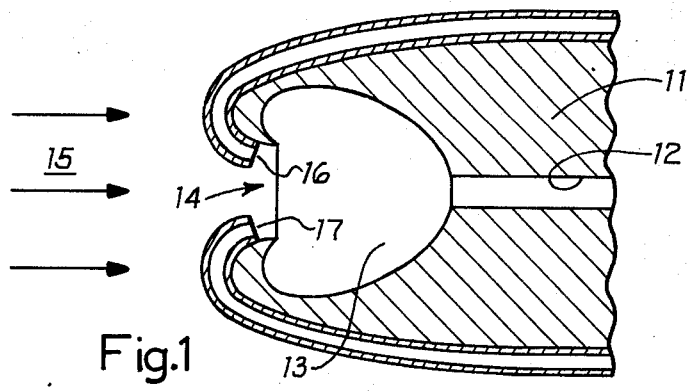
Fig.1
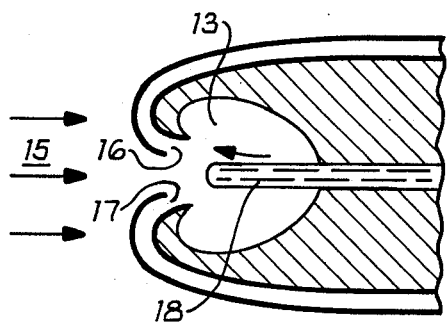
Fig.(2a)
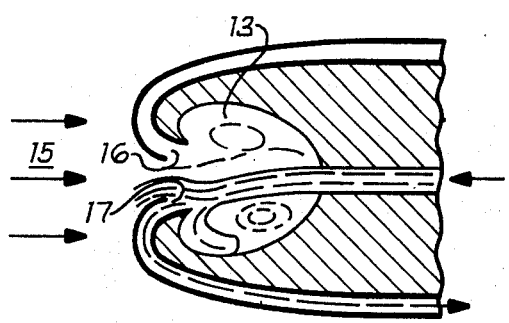
Fig.(2b)
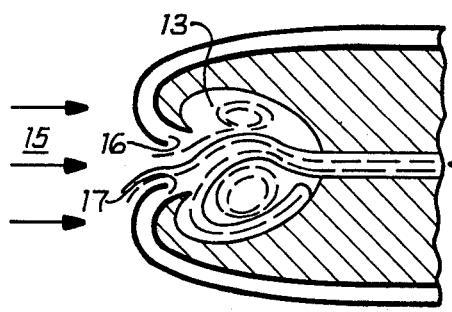
Fig.(2c)
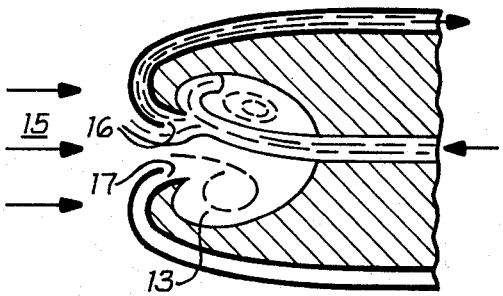
Fig.(2d)
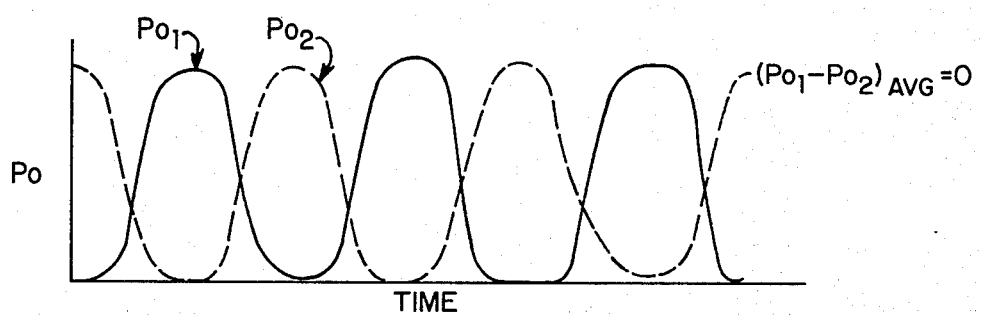
Fig.3

FLUIDIC ANGLE-OF-ATTACK SENSOR

BACKGROUND OF THE INVENTION

The present invention relates to a fluidic sensing device and more particularly to a fluidic device which will provide a differential pressure output proportional to the angle-of-attack of flow impinging on the sensing device.

Angle-of-attack sensors are widely used, particularly on aircrafts where an angle-of-attack system measures the angle between the longitudinal axis of the aircraft and the relative wind. In aircraft, the angle-of-attack is generally measured by a small, balanced vane on the side of the fuselage near the nose. The vane rotates freely to align itself to the relative wind. Attached to the vane is a synchro or other device which converts the vane angle into electrical signals that are transmitted to the cockpit or to an air data computer. Some vanes are equipped with damping means to prevent erratic output in turbulent air.

Another method of sensing angle-of-attack for aircraft is to use a small, forward-and-downward aiming vane which is pivotally mounted in the leading edge of the wing. The vane is spring centered and senses the particular angle at which the airflow at its location changes from over the wing to under the wing by pivoting upward or downward on its horizontal axis.

Vane type sensors, as well as other mechanical sensing devices, work very satisfactorily in air, that is, on aircraft for measuring angle of attack. These mechanical devices, however, have disadvantages, such as clogging, when used in liquids, particularly where debris is present.

SUMMARY OF THE INVENTION

The present invention relates to an angle-of-atack sensor which provides a differential pressure output proportional to the angle-of-attack of flow impinging on the sensor. An excitation flow nozzle is provided which discharges into a coanda-effect cavity. A centrally oriented impingement cavity is provided into which the excitation flow penetrates and impinges on the ambient flow field. A pair of differential output pressure sensing ports are located near the sides of the impingement cavity and point toward the excitation flow nozzle. The completed sensing element is pointed toward the flow field, and mounted on a streamlined structure which generates a minimum bias or distortion to the flow field in the vicinity of the sensor. When activated, the excitation flow first enters centrally into the coanda cavity and as the excitation flow velocity increases, its characteristics change from laminar to turbulent. When the flow becomes turbulent, the flow stream will characteristically start to bend toward, or attach itself to one wall of the coanda cavity. As the stream bends, it impinges on the lip of the impingement cavity causing recirculation of part of the excitation stream back around the coanda cavity walls to the nozzle, which then deflects the excitation stream toward the other side of the coanda cavity. The coanda effect operating on this side of the cavity continues to bend the stream until part of the excitation stream is re-circulated back around this side of the coanda cavity, which deflects it back toward the first side, thus establishing the sensor's characteristic oscillatory nature. As the excitation stream oscillates across the entrance to the impingement cavity, the output ports alternately intercept part of the excitation stream. When the sensor is pointed across the flow field, the sensor maintains its characteristic oscillation, however, now the flow field tends to augment the coanda effect in bending the stream one way, while opposing it in bending it the other way. This results in the excitation stream remaining near one wall of the impingement cavity for a greater fraction of the time of one complete oscillation; hence the average output port differential pressure is not zero but rather is proportional to the angle-of-attack of the flow impinging on the sensor.

It is therefore a general object of the present invention to provide a fluidic device for determining angle-of-attack of a sensor in a flow field.

Other objects, advantages and novel features of the present invention will become apparent from the following detailed description of the invention when considered in conjunction with the accompanying drawings.

BRIEF DESCRIPTION OF THE DRAWINGS

FIG. 1 is a sectional view of one embodiment of the present invention;

FIGS. 2(a) – 2(d) illustrate the fluid flow paths through the device in FIG. 1 for a zero angle-of-attack condition;

FIG. 3 is a diagram of pressure-time history for a zero angle-of-attack condition;

DESCRIPTION OF THE PREFERRED EMBODIMENT

Figure 4:
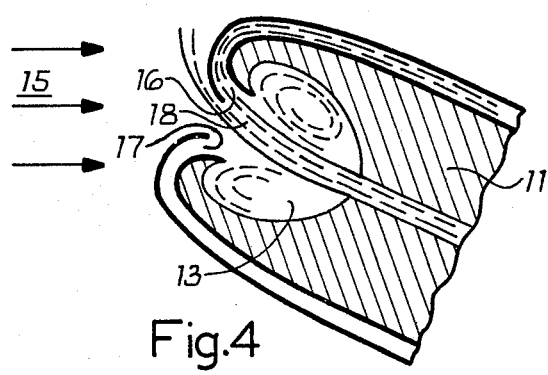
FIG. 4 is a diagram showing a sensor at an angle-of-attack other than zero.

Referring now to the drawings, there is shown in FIG. 1, a fluidic angle-of-attack sensor 11 constructed in accordance with the present invention. An excitation flow nozzle 12 is provided and discharges into a coanda-effect cavity 13. A centrally oriented impingement cavity 14 is provided into which fluid from nozzle 12 penetrates and impinges on an ambient flow field, which is illustrated by arrows 15. A pair of differential output pressure sensing ports 16 and 17 are positioned near the sides of impingement cavity 14 and ports 16 and 17 point toward the excitation flow nozzle 12. Sensor 11 is pointed toward flow field 15 and mounted on a streamlined structure which generates a minimum bias or distortion to flow field 15 in the vicinity of the sensor. The opening into the impigement cavity 14 is greater than the width of the excitation flow nozzle 12, and the excitation stream dynamic pressure is greater than the flow field dynamic pressure.

Referring now to FIGS. 2(a) – 2(d), there is shown conditions which exist when sensor 11 is aimed directly into flow field 15, that is, the angle-of-attack is zero. When activated, the excitation flow from nozzle 12, which might be water 18, first enters centrally into the coanda cavity 13. As the excitation flow velocity increases, its characteristics change from laminar to turbulent. This transition occurs at a Reynolds Number of approximately 3,000, considering that the excitation nozzle width represents the linear dimension in the computation of the Reynolds Number. When the flow becomes turbulent, the flow will characteristically start to bend, as shown in FIG. 2(b), or attaches itself to one wall of the coanda cavity 13. As the stream bends, it impinges on the lip of the impingement cavity 14 causing recirculation of part of the excitation stream back around the coanda cavity walls to the nozzle, as shown in FIG. 2(c), which then deflects the excitation stream 18 toward the second side of the coanda cavity 13, as shown in FIG. 2(d). The coanda effect operating on the second side of cavity 13 continues to bend the stream until part of the excitation stream 13 is recirculated back around the second side of the cavity 13, which deflects stream 13 back toward the first side. The operation is repeated, thus establishing the sensor's characteristic oscillatory nature. As the excitation stream 18 oscillates across the entrance to the impingement cavity 14, output ports 16 and 17 alternately intercept part of the excitation stream thereby resulting in the output port-time history shown in FIG. 3 of the drawings. As excitation stream 18 enters the impingement cavity 14, the ambient flow field 15 tends to assist the coanda effect in bending the stream toward first one side and then the other. As shown in FIGS. 2(a) – 2(d), sensor 11 is pointed directly into flow field 15, corresponding to a zero angle-of-attack condition, and, as shown in FIG. 3 of the drawings, the average output port differential pressure is zero.

Figure 5:
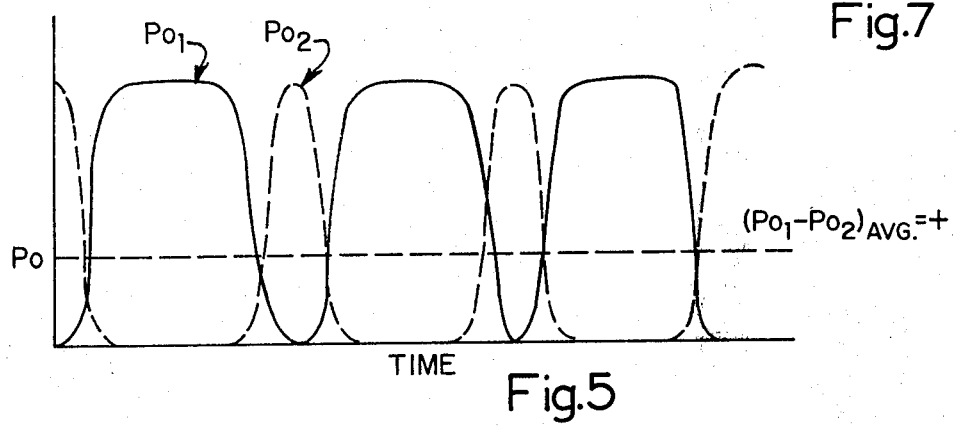
FIG. 5 is a diagram of pressure-time history for the angle-of-attack shown in FIG. 4.

Referring now to FIG. 4 of the drawings, there is shown a sensor 11 which is pointed across a flow field 15 thereby having a significant angle-of-attack condition. Sensor 11 maintains its characteristic oscillation, however, flow field 15 tends to augment the coanda effect in bending stream 18 one way, while opposing it in bending the other way. This action by flow field 15 results in the excitation stream remaining near one wall of cavity 13 for a greater period of time and hence, the average output port differential pressure is not zero, as shown in FIG. 5 of the drawings.

Figure 6:
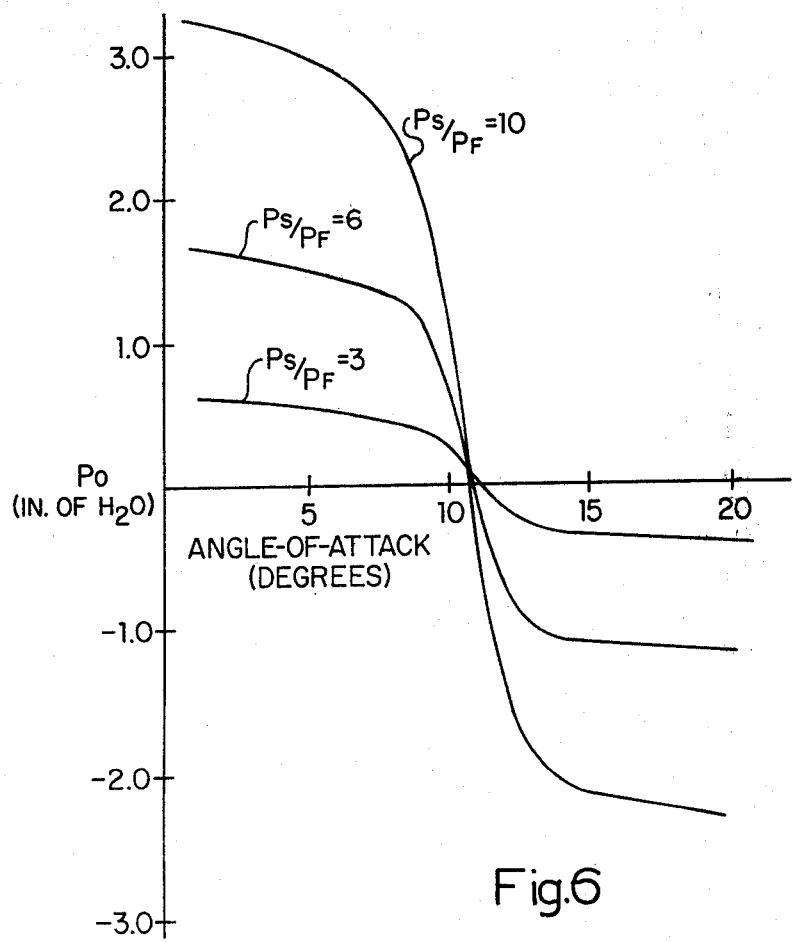
FIG. 6 is a graph showing the relationship of output differential pressures and angle-of-attack for various pressure ratios.

Angle-of-attack is a function of output port differential pressure and, in FIG. 6 of the drawings, there is shown the relationship of output port differential pressure ($P_o$) to angle-of-attack for different values of the ratio of excitation stream dynamic pressure ($P_e$) to flow field dynamic pressure ($P_F$). It can be seen in FIG. 6 of the drawings that at zero differential output port pressure, the angle-of-attackk is 11 degrees. This point of cross-over, called the trim point, may be varied and, in FIG. 7 of the drawings, there is shown an embodiment having a trim control arrangement. An excitation nozzle 21 is provided in a cylindrical drum 22 which can be rotated to direct the excitation flow stream nearer one sidewall of the coanda cavity 13 thereby producing an effective bias, or trim control, for sensor 23.

Figure 7:
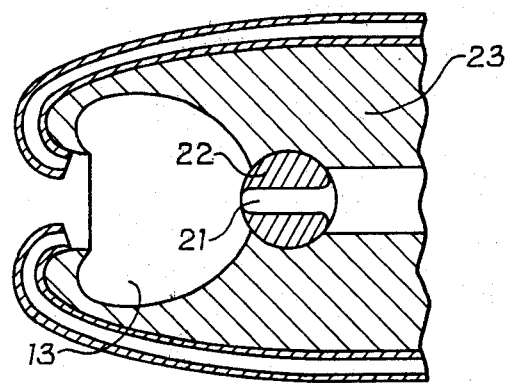
FIG. 7 is a sectional view of another embodiment of an angle-of-attack sensor.

The performance of the sensors shown in FIGS. 1 and 7 is basically established by the excitation pressure rather than the flow field dynamic pressure. This can provide an advantage in applying the sensor of the present invention to an automatic control system such as one that might be used for a variable area flush inlet on a surface effects ship. If the propulsion pump pressure is used for excitation pressure, a nearly constant magnitude signal is available over the ship's complete speed range since the propulsion pump pressure remains relatively constant.

The present invention provides a sensor which is basically adaptable to many types of automatic control systems for hydrodynamic and aerodynamic vehicles in which the sensing of the vehicle's angle-of-attack with respect to a fluid flow field is required for proper control maneuvering, or navigational purposes.

Obviously many modifications and variations of the present invention are possible in the light of the above teachings. It is therefore to be understood that within the scope of the appended claims the invention may be practiced otherwise than as specifically described.

I claim:

1. A fluidic sensor for determining angle-of-attack of a flow field impinging on said sensor comprising, a coanda-effect cavity having a centrally oriented impingement cavity, first and second output pressure sensing ports positioned on opposite sides of said centrally oriented impingement cavity, and means for supplying excitation fluid into said coanda-effect cavity at a velocity greater than the velocity of said flow field, said coanda-effect cavity directing a portion of said excitation fluid to alternately enter said first and second output pressure sensing ports and provide equal pressure outputs therefrom when said fluidic sensor is oriented in a zero angle-of-attack position and, when said sensor is oriented in an angle-of-attack other than a zero angle-of-attack position, said flow field impinges on said excitation fluid to provide unequal flow of fluid into said first and second output pressure sensing ports to provide differential pressure proportional to the angle-of-attack of said fluidic sensor relative to said flow field.

2. A fluidic sensor for determining angle-of-attack of a flow field as set forth in claim 1 wherein said means for supplying excitation fluid into said coanda-effect cavity provides fluid having a turbulent flow whereby the flow stream will bend and attach itself to one wall of said coanda-effect cavity.

3. A fluidic sensor for determining angle-of-attack of a flow field as set forth in claim 1 wherein said excitation fluid is water.

4. A fluidic sensor for determining angle-of-attack of a flow field as set forth in claim 1 having means for varying the zero differential output port pressure relative to the angle-of-attack of said flow field.

5. A fluidic sensor for determining angle-of-attack of a flow field as set forth in claim 4 wherein said means for varying the zero differential output port pressure relative to the angle-of-attack of said flow field includes a pivotal nozzle for supplying excitation fluid into said coanda-effect cavity.

6. A fluidic sensor for determining angle-of-attack of a flow field as set forth in claim 4 wherein said means for varying the zero differential output port pressure relative to the angle-of-attack of said flow field includes a cylindrical drum rotatably mounted in said sensor and a nozzle in said drum.

* * * * *